US012640966B2

(12) United States Patent
Wu

(10) Patent No.: US 12,640,966 B2
(45) Date of Patent: May 26, 2026

(54) SEQUENCE DETECTION DEVICE USING MAXIMUM LIKELIHOOD SEQUENCE DETECTION WITH PROGRAMMABLE BRANCH METRIC COMPUTATION REDUCTION AND ASSOCIATED SEQUENCE DETECTION METHOD

(71) Applicant: Airoha Technology Corp., Hsinchu City (TW)

(72) Inventor: Min-Hua Wu, Hsinchu County (TW)

(73) Assignee: Airoha Technology Corp., Hsinchu City (TW)

( * ) Notice: Subject to any disclaimer, the term of this patent is extended or adjusted under 35 U.S.C. 154(b) by 42 days.

(21) Appl. No.: 18/946,947

(22) Filed: Nov. 14, 2024

(65) Prior Publication Data

US 2026/0135738 A1    May 14, 2026

(51) Int. Cl.
*H04L 25/03*        (2006.01)
*H04L 25/49*        (2006.01)

(52) U.S. Cl.
CPC .. *H04L 25/03057* (2013.01); *H04L 25/03203* (2013.01); *H04L 25/03305* (2013.01); *H04L 25/4917* (2013.01)

(58) Field of Classification Search
CPC ......... H04L 25/03057; H04L 25/03203; H04L 25/03305; H04L 25/4917
See application file for complete search history.

(56) References Cited

U.S. PATENT DOCUMENTS

| | | | |
|---|---|---|---|
| 9,385,896 B1 * | 7/2016 | Mitra ................ | H04L 25/03203 |
| 2009/0187813 A1 * | 7/2009 | Haratsch .......... | H03M 13/6588 |
| | | | 714/795 |
| 2017/0063578 A1 * | 3/2017 | Liao ................. | H04L 25/03057 |
| 2023/0118769 A1 | 4/2023 | Liu | |
| 2025/0055735 A1 * | 2/2025 | Graumann ........ | H04L 25/03229 |

FOREIGN PATENT DOCUMENTS

| | | |
|---|---|---|
| CN | 115996161 A | 4/2023 |
| TW | I858619 B | 10/2024 |

* cited by examiner

*Primary Examiner* — David B Lugo
(74) *Attorney, Agent, or Firm* — Winston Hsu

(57)        ABSTRACT

A sequence detection device includes a feed-forward filter and a sequence detection circuit. The feed-forward filter processes a received signal to generate an equalized signal. The sequence detection circuit performs sequence detection upon the equalized signal to generate and output a symbol sequence. The sequence detection circuit includes a region estimation circuit and a trellis selection circuit. The region estimation circuit categorizes each of samples included in the equalized signal into one of regions. The trellis selection circuit selects one of trellis schemes for branch metric calculation according to region estimation results of two of the samples output from the region estimation circuit.

20 Claims, 18 Drawing Sheets

X=3 (high loss high SNR)

X=3 (low loss low SNR)

Region -3        Region 0        Region 3

PMF3
PMFm3

$TH_H$        $TH_L$

Probability

Position

SEQUENCE DETECTION DEVICE USING MAXIMUM LIKELIHOOD SEQUENCE DETECTION WITH PROGRAMMABLE BRANCH METRIC COMPUTATION REDUCTION AND ASSOCIATED SEQUENCE DETECTION METHOD

BACKGROUND OF THE INVENTION

1. Field of the Invention

The present invention relates to data communications, and more particularly, to a sequence detection device using maximum likelihood sequence detection with programmable branch metric computation reduction and an associated sequence detection method.

2. Description of the Prior Art

In high-speed data communication systems, existing filtering and equalization schemes may not be enough to support challenging channels. For example, due to the high demand of data communication speed, data bandwidth grows significantly. As a result, inter-symbol interference (ISI) of a data channel and crosstalk interference from adjacent data channels becomes more severe, and the data modulation scheme is more complex. A typical feed-forward equalizer (FFE) can remove the pre-cursor ISI and the post-cursor ISI by using information from adjacent symbols. However, since the typical FFE does not use any noise-free estimated symbol (e.g., noise-free sliced symbols), the noise apart from ISI may be enhanced by the typical FFE. A typical decision-feedback equalizer (DFE) can remove the post-cursor ISI by using one or more noise-free estimated previous symbols (e.g., one or more noise-free sliced previous symbols). However, error propagation may be induced by the typical DFE due to the reliance on previous decision(s). In other words, traditional linear equalization method (e.g., feed-forward equalization) and non-linear equalization method (e.g., decision-feedback equalization) are unable to provide sufficient performance for some circumstances. Maximum likelihood sequence detection (MLSD) utilizes and further removes the ISI to deal with noise, and becomes a popular technique to enhance performance and overcome non-linear error in the high-speed data communication system. However, MLSD needs to implement a Viterbi algorithm, and has a higher level of implementation complexity and a higher level of computation resource consumption. For example, to practice a Viterbi algorithm in a system that has K data states, the number of branch metric (BM) calculations in one data cycle may be $K^2$, which means lots of computation resources needed to acquire BM information. Thus, there is a need for innovative low-complexity and power-efficient MLSD in a sequence detector used by the high-speed data communication system.

SUMMARY OF THE INVENTION

One of the objectives of the claimed invention is to provide a sequence detection device using maximum likelihood sequence detection with programmable branch metric computation reduction and an associated sequence detection method.

According to a first aspect of the present invention, an exemplary sequence detection device is disclosed. The exemplary sequence detection device includes a feed-forward filter and a sequence detection circuit. The feed-forward filter is configured to process a received signal to generate an equalized signal. The sequence detection circuit is configured to perform sequence detection upon the equalized signal to generate and output a symbol sequence. The sequence detection circuit includes a region estimation circuit and a trellis selection circuit. The region estimation circuit is configured to categorize each of a plurality of samples included in the equalized signal into one of a plurality of regions. The trellis selection circuit is configured to select one of a plurality of trellis schemes for branch metric calculation according to region estimation results of two of the plurality of samples output from the region estimation circuit.

According to a second aspect of the present invention, an exemplary sequence detection device is disclosed. The exemplary sequence detection device includes a sequence detection circuit. The sequence detection circuit is configured to perform sequence detection upon a received signal to generate and output a symbol sequence, wherein the received signal is an output signal of an analog-to-digital converter (ADC). The sequence detection circuit includes a region estimation circuit and a trellis selection circuit. The region estimation circuit is configured to categorize each of a plurality of samples included in the received signal into one of a plurality of regions. The trellis selection circuit is configured to select one of a plurality of trellis schemes for branch metric calculation according to region estimation results of two of the plurality of samples output from the region estimation circuit.

According to a third aspect of the present invention, an exemplary sequence detection method is disclosed. The exemplary sequence detection method includes: obtaining a data signal, and performing a sequence detection operation upon the data signal to generate and output a symbol sequence. The step of obtaining the data signal includes: receiving an output of an analog-to-digital converter (ADC) as the data signal, or performing a feed-forward filtering operation upon the output of the ADC to generate an equalized signal as the data signal. The sequence detection operation includes: performing a region estimation operation to categorize each of a plurality of samples included in the data signal into one of a plurality of regions, and performing a trellis selection operation to select one of a plurality of trellis schemes for branch metric calculation according to region estimation results of two of the plurality of samples output from the region estimation operation.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 8 is a diagram illustrating a first configuration of four programmable threshold values used by the region estimation circuit that is implemented by a 5-level slicer according to an embodiment of the present invention.

FIG. 12 is a diagram illustrating fixed trellis schemes used by the trellis selection circuit according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to. . .". Also, the term "couple" is intended to mean either an indirect or direct electrical connection. Accordingly, if one device is coupled to another device, that connection may be through a direct electrical connection, or through an indirect electrical connection via other devices and connections.

Figure 1:
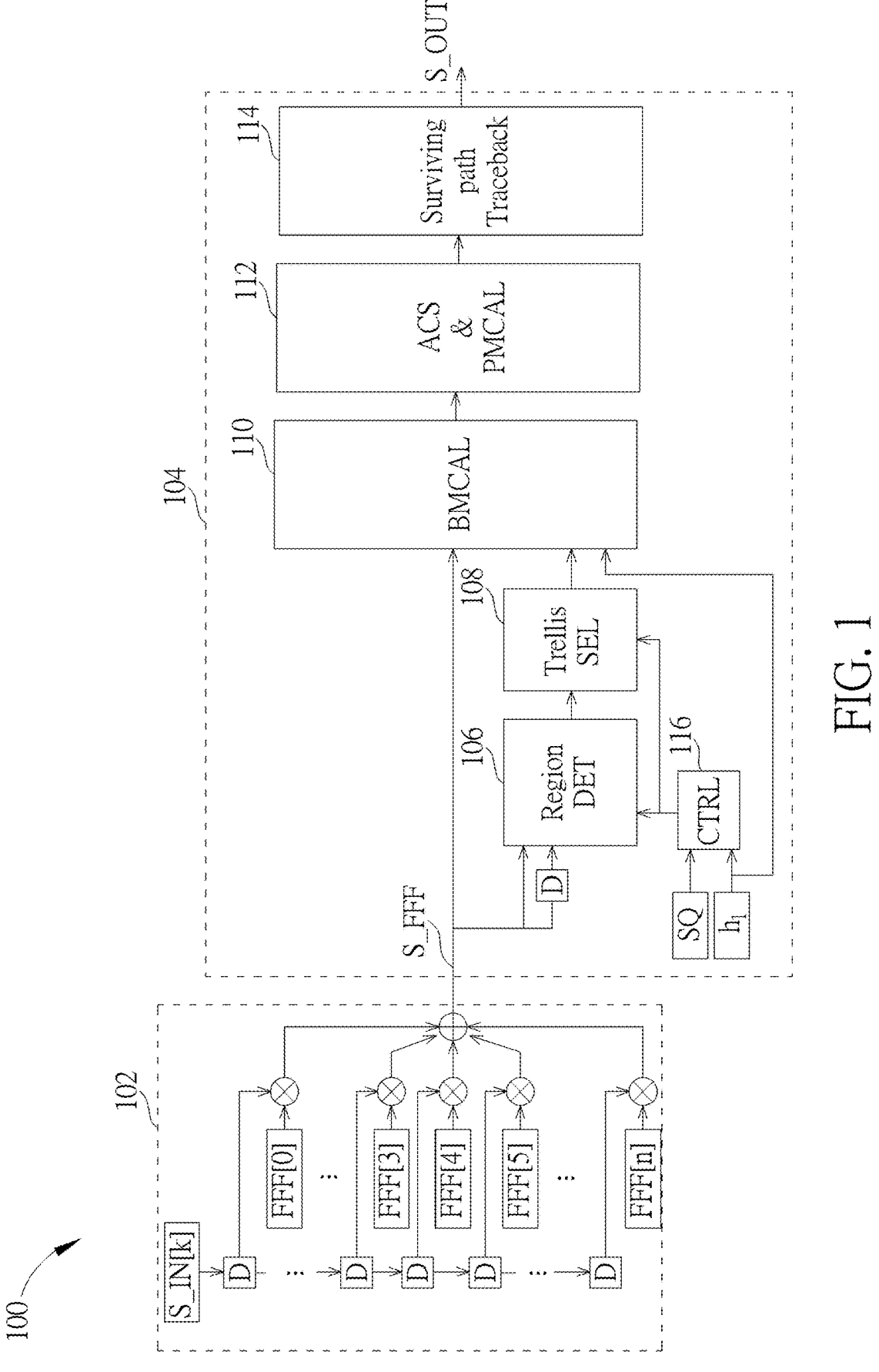
FIG. 1 is a diagram illustrating a sequence detection device using MLSD with programmable BM computation reduction according to an embodiment of the present invention.

FIG. 1 is a diagram illustrating a sequence detection device using maximum likelihood sequence detection (MLSD) with programmable branch metric (BM) computation reduction according to an embodiment of the present invention. The sequence detection device 100 may be a part of a receiver in a data communication system. In this embodiment, the sequence detection device 100 is a digital circuit, and includes a feed-forward filter (FFF) 102 and a sequence detection circuit 104. For example, the FFF 102 may be a feed-forward equalizer (FFE). As shown in FIG. 1, the FFF 102 may be implemented by an (n+1) -tap FFE having (n+1) FFE coefficients FFF[0]-FFF[n](n≥0). However, this is for illustrative purposes only, and is not meant to be a limitation of the present invention. In practice, any suitable FFE structure may be employed by the FFF 102. That is, the present invention has no limitations on the FFF design.

The FFF 102 is configured to process a received signal S_IN[k] to generate an equalized signal S_FFF as a data signal to be processed by sequence detection (e.g., MLSD), where the received signal S_IN[k] is a digital signal generated from an analog-to-digital converter (ADC) of the receiver. For example, a pulse-amplitude modulation (PAM) signal is generated and transmitted from a transmitter of the data communication system to the receiver of the data communication system via a channel, and the received signal S_IN[k] is a digital signal derived from the PAM signal. Taking 4-level PAM (PAM4) signaling for example, there are four symbols $\{-3, -1, +1, +3\}$, and each symbol corresponds to a pair of two bits. For example, four bit choices 00, 01, 10, and 11 may be associated with amplitudes of $-3$, $-1$, $+1$, and $+3$, respectively.

The sequence detection circuit 104 is configured to perform sequence detection upon the data signal (e.g., equalized signal S_FFF) to generate and output a symbol sequence S_OUT. Taking PAM4 signaling for example, the symbol sequence S_OUT is a sequence of symbols each being decided by the sequence detection to be one of four PAM symbols. In this embodiment, the sequence detection circuit 104 is configured to employ the proposed MLSD with programmable BM computation reduction. As shown in FIG. 1, the sequence detection circuit 104 includes a region estimation circuit (labeled by "region DET") 106, a trellis selection circuit (labeled by "trellis SEL") 108, a BM calculation circuit (labeled by "BMCAL") 110, an add-compare-select (ACS) and path metric (PM) calculation circuit (labeled by "ACS & PMCAL") 112, a surviving path and trace-back circuit (labeled by "surviving path trace-back") 114, and a control circuit (labeled by "CTRL") 116.

Figure 2:
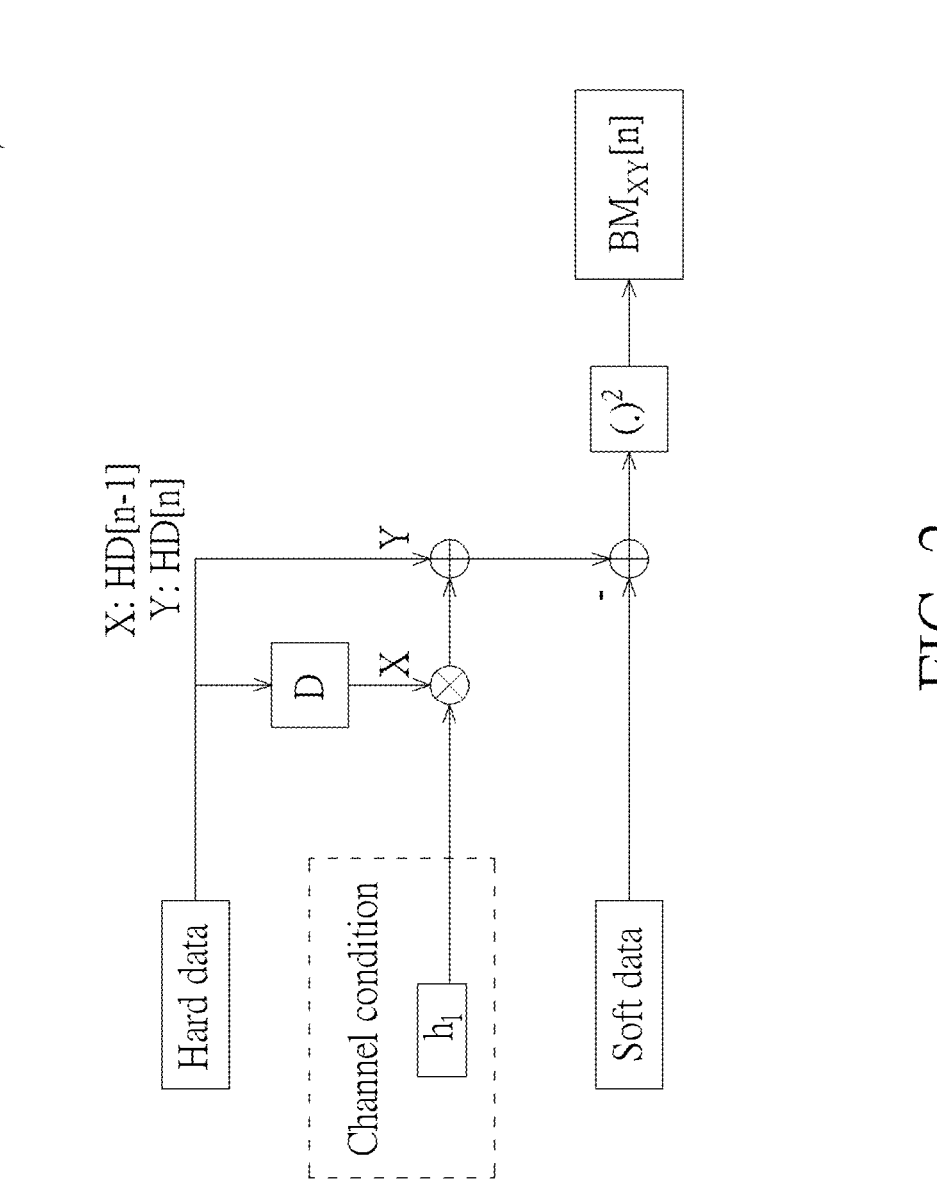
FIG. 2 is a diagram illustrating a BM calculation unit employed by the BM calculation circuit shown in FIG. 1.

The BM calculation circuit 110 is configured to calculate a branch metric $BM_{XY}[n]$ of a branch between one preceding state X of trellis at a preceding time instant T[n−1] and one succeeding state Y of trellis at a succeeding time instant T[n]. FIG. 2 is a diagram illustrating a BM calculation unit employed by the BM calculation circuit 110 shown in FIG. 1. The BM calculation unit 200 is used to calculate and output the branch metric $BM_{XY}[n]$, where computation of the branch metric $BM_{XY}[n]$ may be expressed using the following equation.

$$BM_{XY}[n]=(Y+h_1*X-S[n])^2 \tag{1}$$

In above equation (1), X represents the hard data of state X at the time instant T[n−1] (i.e., X=HD[n−1]), Y represents the hard data of state Y at the time instant T[n] (i.e., Y=HD[n]), S[n] represents soft data of a received sample at the time instant T[n] (e.g., S [n]=S_FFF[n] or S_IN[n]), and $h_1$ is indicative of the channel condition (e.g., channel loss condition). Specifically, the branch metric $BM_{XY}[n]$ is indicative of an error distance to a target level from state X at time instant T[n−1] to state Y at time instant T[n].

The ACS and PM calculation circuit 112 is configured to calculate a path metric $PM_Y[n]$ of one state Y of trellis at the time instant T[n], where the path metric $PM_Y[n]$ is indicative of an accumulated error distance of a surviving path $SP_Y[n]$. The surviving path and trace-back circuit 114 is configured to record the surviving path $SP_Y[n]$. In addition, the surviving path and trace-back circuit 114 employs a trace-back approach to identify a sequence of symbols according to surviving paths. Since the present invention is focused on the proposed BM computation reduction technique and a person skilled in the art should readily understand principles of the rest of operations (e.g., PM calculation, SP determination, and SP-based trace-back) performed by the sequence detection circuit 104, further description of the rest of operations performed by the sequence detection circuit 104 is omitted here for brevity.

The region estimation circuit 106 is configured to categorize each of a plurality of samples included in the equalized signal S_FFF into one of a plurality of regions, where the regions are defined by multiple threshold values. The trellis selection circuit 108 is configured to select one of a plurality of trellis schemes for BM calculation according to region estimation results of two of the samples output from the region estimation circuit 106, where each of the trellis schemes is indicative of selected branches with high possibilities between states at time instants T[n−1] and T[n]. Specifically, the trellis schemes may include a first trellis scheme and a second trellis scheme, wherein selected branches included in the first trellis scheme may be different from selected branches included in the second trellis scheme, and/or the number of selected branches included in the first trellis scheme may be different from the number of selected branches included in the second trellis scheme.

In this embodiment, the regions (particularly, threshold values that define the regions) adopted by the region estimation circuit 106 for region estimation of each sample (soft data) included in the equalized signal S_FFF may be adaptively adjusted, and/or the trellis schemes adopted by the trellis selection circuit 108 for trellis scheme selection may be adaptively adjusted. For example, the control circuit 116 is configured to obtain a channel condition indicator $h_1$ (which is indicative of channel loss) and a signal quality indicator SQ such as a signal-to-noise ratio indicator SNRIND or an error level indicator ELIND, and adaptively adjust the threshold values (which are programmable) according to the channel condition indicator $h_1$ and the signal quality indicator SQ (e.g., SQ=SNRIND or ELIND); and the trellis schemes adopted by the trellis selection circuit 108 are fixed. For another example, the control circuit 116 is configured to obtain a channel condition indicator $h_1$ (which is indicative of channel loss) and a signal quality indicator SQ (e.g., SQ=SNRIND or ELIND), and adaptively adjust the trellis schemes (which are programmable) according to the channel condition indicator $h_1$ and the signal quality indicator SQ; and the threshold values (regions) adopted by the region estimation circuit 106 are fixed. For yet another example, the control circuit 116 is configured to obtain a channel condition indicator $h_1$ (which is indicative of channel loss) and a signal quality indicator SQ (e.g., SQ=SNRIND or ELIND), and adaptively adjust the threshold values (which are programmable) and the trellis schemes (which are programmable) according to the channel condition indicator $h_1$ and the signal quality indicator SQ.

Figure 3:
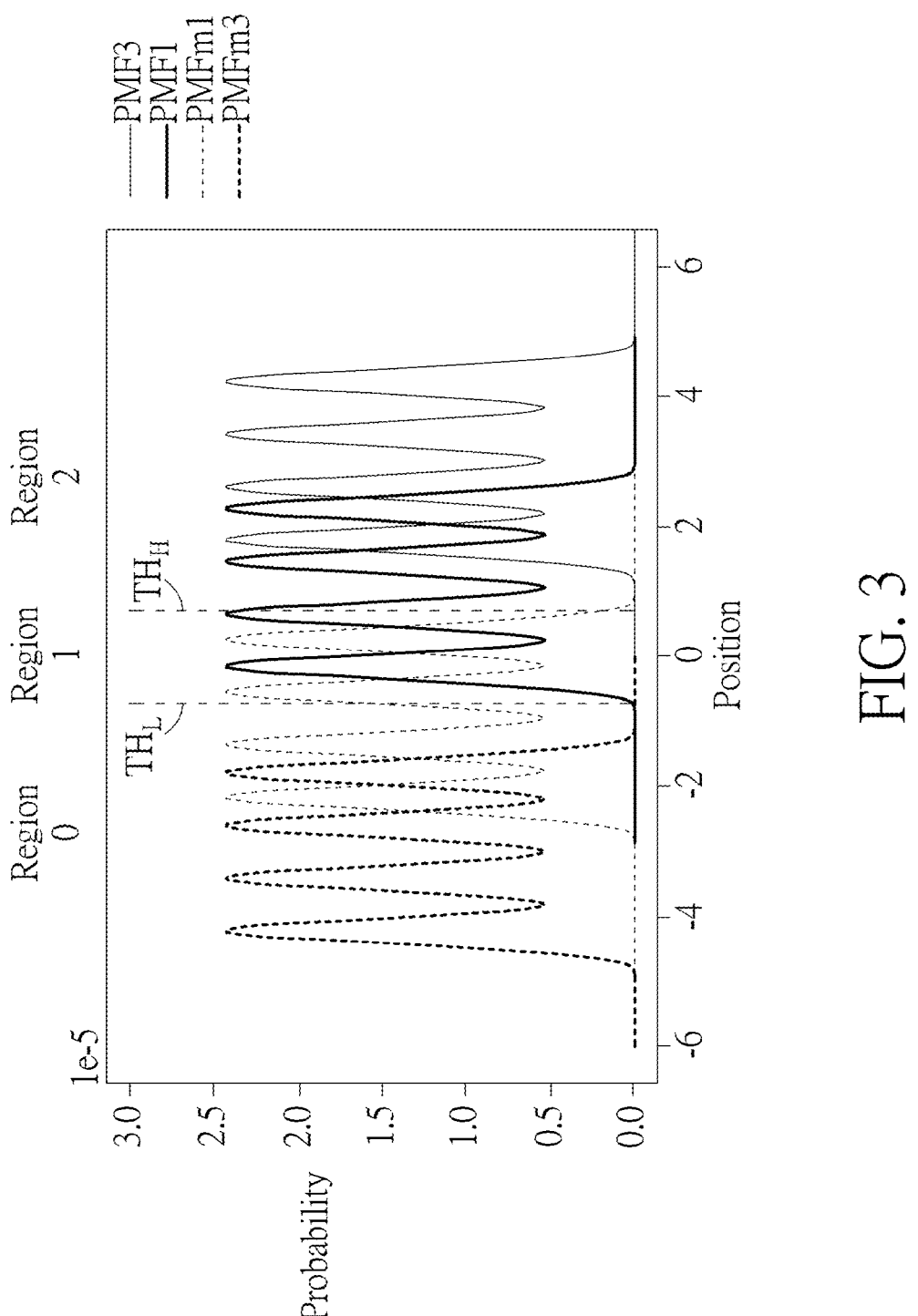
FIG. 3 is a diagram illustrating a first configuration of two programmable threshold values used by the region estimation circuit that is implemented by a 3-level slicer according to an embodiment of the present invention.

In some embodiments of the present invention, the region estimation circuit 106 may be implemented by an X-level slicer (X≥2), and (X-1) threshold values required by the X-level slicer may be programmable. FIG. 3 is a diagram illustrating a first configuration of two programmable threshold values $TH_H$, $TH_L$ used by the region estimation circuit 106 that is implemented by a 3-level slicer (X=3) according to an embodiment of the present invention. The region estimation circuit 106 may be used to process samples of the equalized signal S_FFF that is generated from applying a feed-forward filtering operation (e.g., feed-forward equalization) to the received signal S_IN[k] derived from a PAM4 signal. The probability density function of the symbol+3 transmitted over the data channel is represented by the probability distribution curve PMF3. The probability density function of the symbol+1 transmitted over the data channel is represented by the probability distribution curve PMF1. The probability density function of the symbol −1 transmitted over the data channel is represented by the probability distribution curve PMFm1. The probability density function of the symbol −3 transmitted over the data channel is represented by the probability distribution curve PMFm3. Since probability distributions of different symbols {−3, −1, +1, +3} transmitted over the data channel may vary when the channel condition and/or the signal condition change, the control circuit 116 instructs the region estimation circuit 106 to adaptively adjust the threshold values $TH_L$ and $TH_H$ for different channel conditions and/or different signal conditions, thereby improving the sequence detection performance. For example, when the channel condition indicator $h_1$ indicates that the current channel condition is a high loss condition and the signal quality indicator SQ (e.g., SQ=SNRIND) indicates that the current signal condition is a high SNR condition, the control circuit 116 instructs the region estimation circuit 106 to adopt the threshold values $TH_L$ and $TH_H$ illustrated in FIG. 3.

Figure 4:
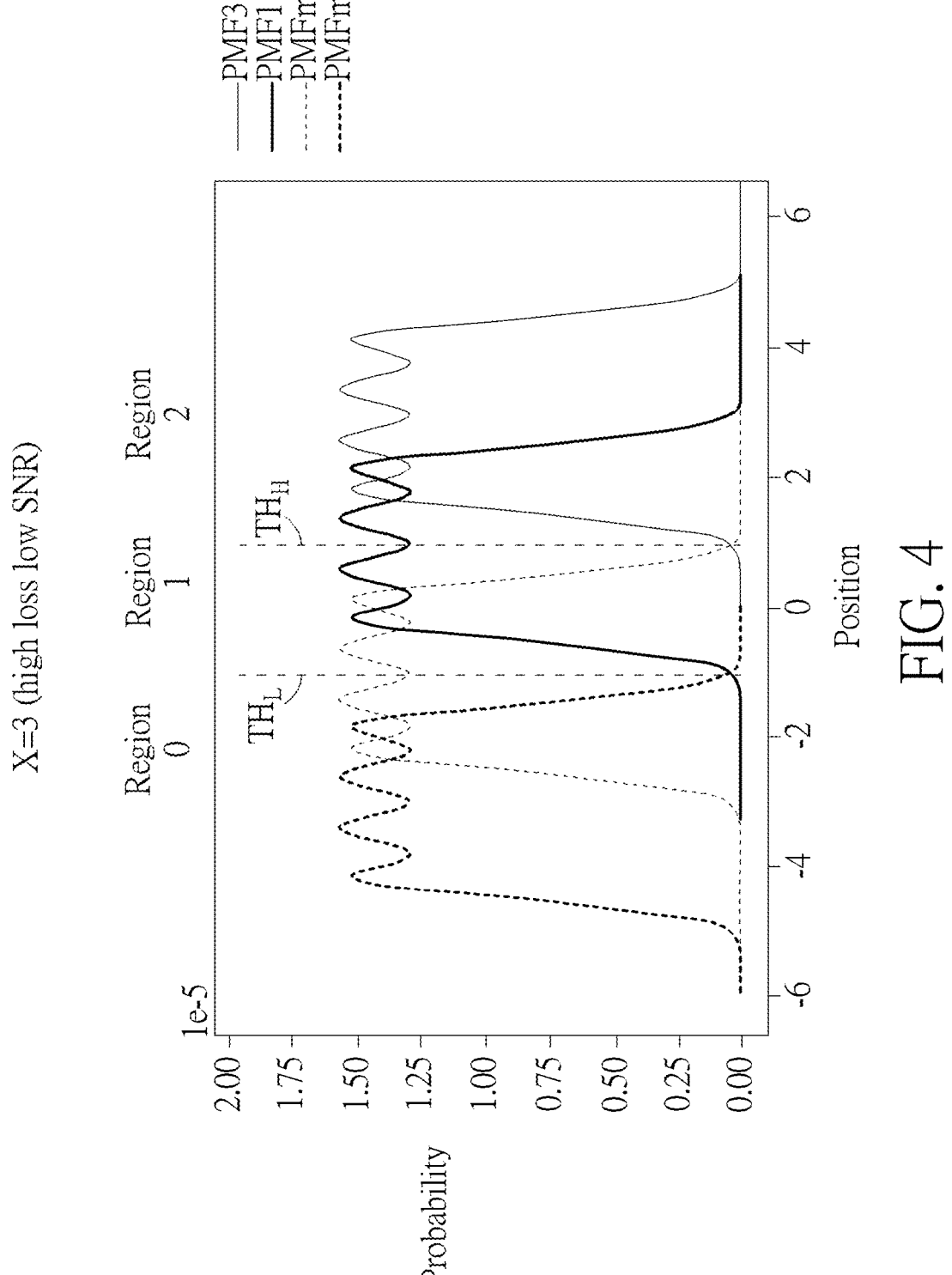
FIG. 4 is a diagram illustrating a second configuration of two programmable threshold values used by the region estimation circuit that is implemented by a 3-level slicer according to an embodiment of the present invention.

FIG. 4 is a diagram illustrating a second configuration of two programmable threshold values $TH_H$, $TH_L$ used by the region estimation circuit 106 that is implemented by a 3-level slicer (X=3) according to an embodiment of the present invention. When the channel condition indicator $h_1$ indicates that the current channel condition is a high loss condition and the signal quality indicator SQ (e.g., SQ=SNRIND) indicates that the current signal condition is a low SNR condition, the control circuit 116 instructs the region estimation circuit 106 to adopt the threshold values $TH_L$ and $TH_H$ illustrated in FIG. 4.

Figure 5:
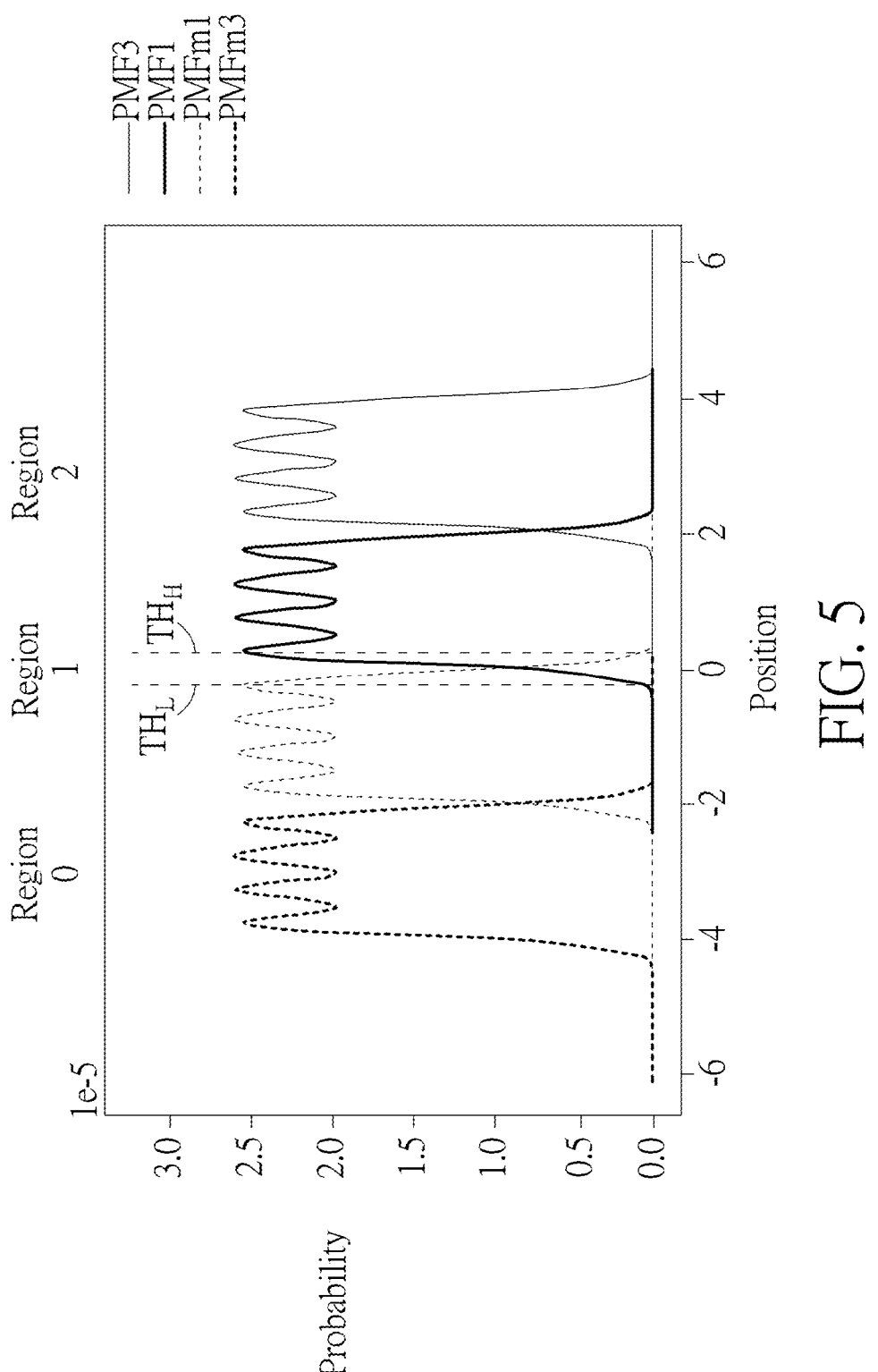
FIG. 5 is a diagram illustrating a third configuration of two programmable threshold values used by the region estimation circuit that is implemented by a 3-level slicer according to an embodiment of the present invention.

FIG. 5 is a diagram illustrating a third configuration of two programmable threshold values $TH_H$, $TH_L$ used by the region estimation circuit 106 that is implemented by a 3-level slicer (X=3) according to an embodiment of the present invention. When the channel condition indicator $h_1$ indicates that the current channel condition is a low loss condition and the signal quality indicator SQ (e.g., SQ=SNRIND) indicates that the current signal condition is a high SNR condition, the control circuit 116 instructs the region estimation circuit 106 to adopt the threshold values $TH_L$ and $TH_H$ illustrated in FIG. 5.

Figure 6:
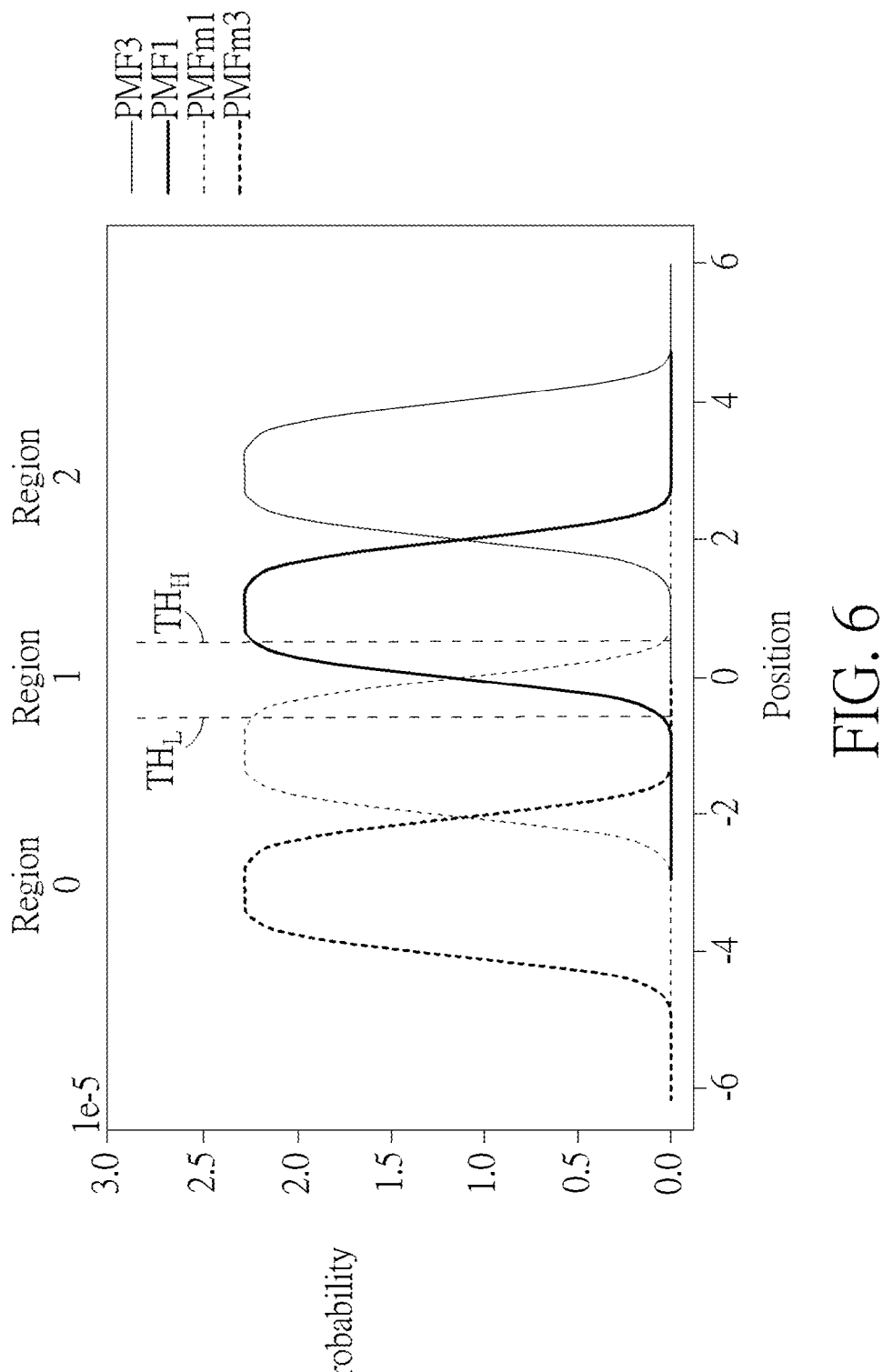
FIG. 6 is a diagram illustrating a fourth configuration of two programmable threshold values used by the region estimation circuit that is implemented by a 3-level slicer according to an embodiment of the present invention.

FIG. 6 is a diagram illustrating a fourth configuration of two programmable threshold values $TH_H$, $TH_L$ used by the region estimation circuit 106 that is implemented by a 3-level slicer (X=3) according to an embodiment of the present invention. When the channel condition indicator $h_1$ indicates that the current channel condition is a low loss condition and the signal quality indicator SQ (e.g., SQ=SNRIND) indicates that the current signal condition is a low SNR condition, the control circuit 116 instructs the region estimation circuit 106 to adopt the threshold values $TH_L$ and $TH_H$ illustrated in FIG. 6.

When the region estimation circuit 106 categorizes a sample (soft data) of the equalized signal S_FFF into region 2, it implies that the possibility of a symbol+3 or +1 that is transmitted over the data channel is high, and the possibility of a symbol −3 or −1 that is transmitted over the data channel is low. When the region estimation circuit 106 categorizes a sample (soft data) of the equalized signal S_FFF into region 1, it implies that the possibility of a symbol −1 or +1 that is transmitted over the data channel is high, and the possibility of a symbol −3 or +3 that is transmitted over the data channel is low. When the region estimation circuit 106 categorizes a sample (soft data) of the equalized signal S_FFF into region 0, it implies that the possibility of a symbol −3 or −1 that is transmitted over the data channel is high, and the possibility of a symbol+3 or +1 that is transmitted over the data channel is low. Hence, based on the region estimation results of two consecutive samples (e.g., a sample at the time instant T[n−1] and a sample at the time instant T [n]), some branches between states at time instants T[n−1] and T[n] may have high possibilities, and some branches between states at time instants T[n−1] and T[n] may have low possibilities. Hence, branches with low possibilities may be unselected to achieve BM computation reduction. Specifically, the number of BM calculations per symbol can be reduced since the possibilities of certain branches are too low and these low-possibility branches are not worth doing BM computation.

Figure 7:
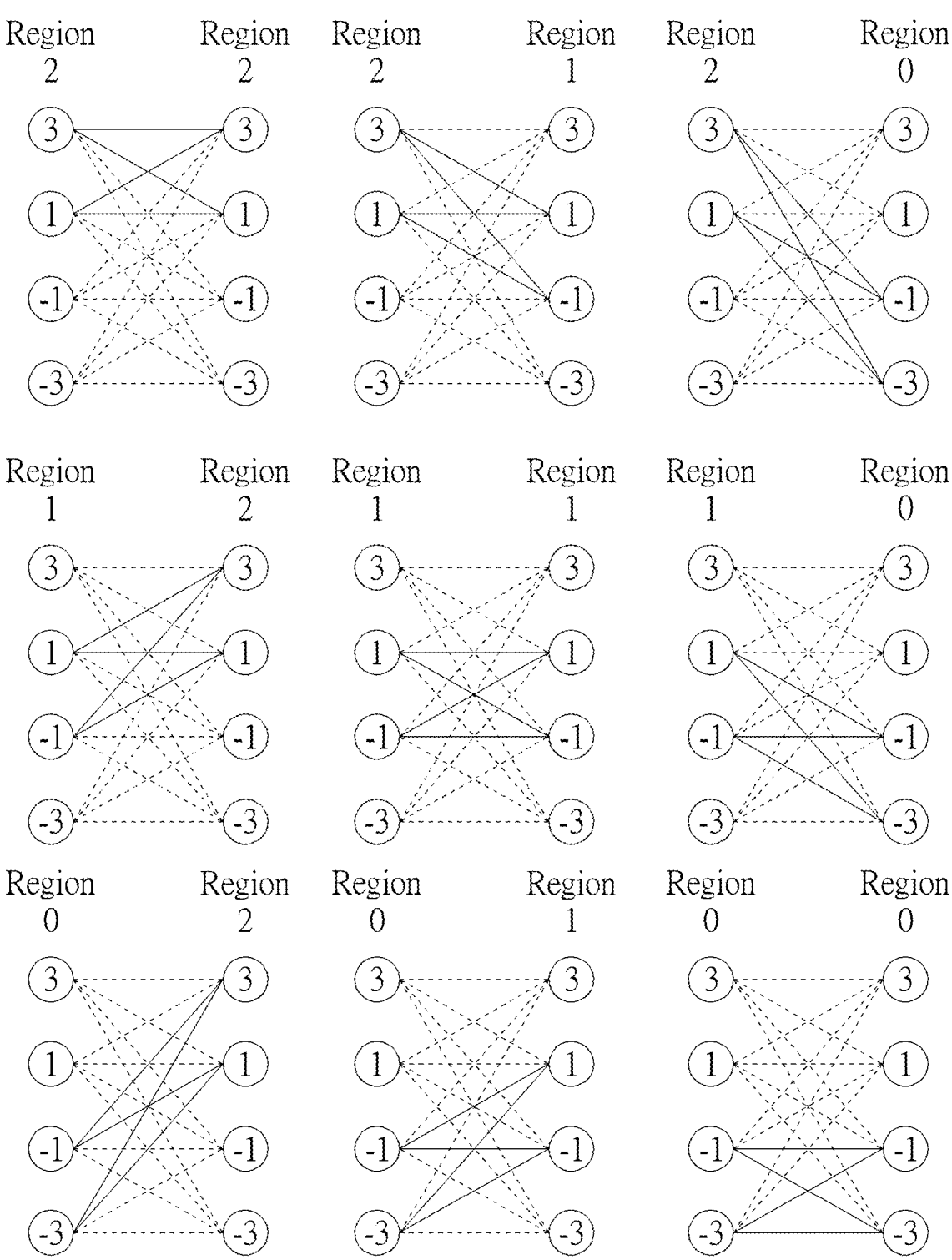
FIG. 7 is a diagram illustrating fixed trellis schemes used by the trellis selection circuit according to an embodiment of the present invention.

FIG. 7 is a diagram illustrating fixed trellis schemes used by the trellis selection circuit 108 according to an embodiment of the present invention. The fixed trellis schemes shown in FIG. 7 are shared under different channel conditions (e.g., high loss condition and low loss condition) and different signal conditions (e.g., high SNR condition and low SNR condition). Hence, each of the trellis schemes is indexed by a region estimation result of a sample at the time instant T[n−1] and a region estimation result of a sample at the time instant T[n] that are determined using the threshold values $TH_L$ and $TH_H$ illustrated in any of FIGS. 3-6. The trellis selection circuit 108 selects one of the fixed trellis schemes for BM computation according to a region estimation result of a sample at the time instant T[n−1] and a region estimation result of a sample at the time instant T[n]. For example, when the sample at the time instant T[n−1] is categorized into region 2 and the sample at the time instant T[n] is categorized into region 2, branches starting from states+3 and +1 and ending at states+3 and +1 are selected for BM computation, and branches starting from states −3 and −1 or ending at states −3 and −1 are not selected for BM computation. For another example, when the sample at the time instant T[n−1] is categorized into region 2 and the sample at the time instant T[n] is categorized into region 1, branches starting from states+3 and +1 and ending at states −1 and +1 are selected for BM computation, and branches starting from states −3 and −1 or ending at states+3 and −3 are not selected for BM computation. As a person skilled in the art can readily understand details of the rest of the trellis schemes shown in FIG. 7 after reading above description, further explanation is omitted here for brevity.

The region estimation circuit 106 may be implemented by an X-level slicer (X≥2), and the (X-1) threshold values used by the X-level slicer may be programmable or fixed. It should be noted that the value of X may be adjusted, depending upon actual design considerations.

Figure 8:
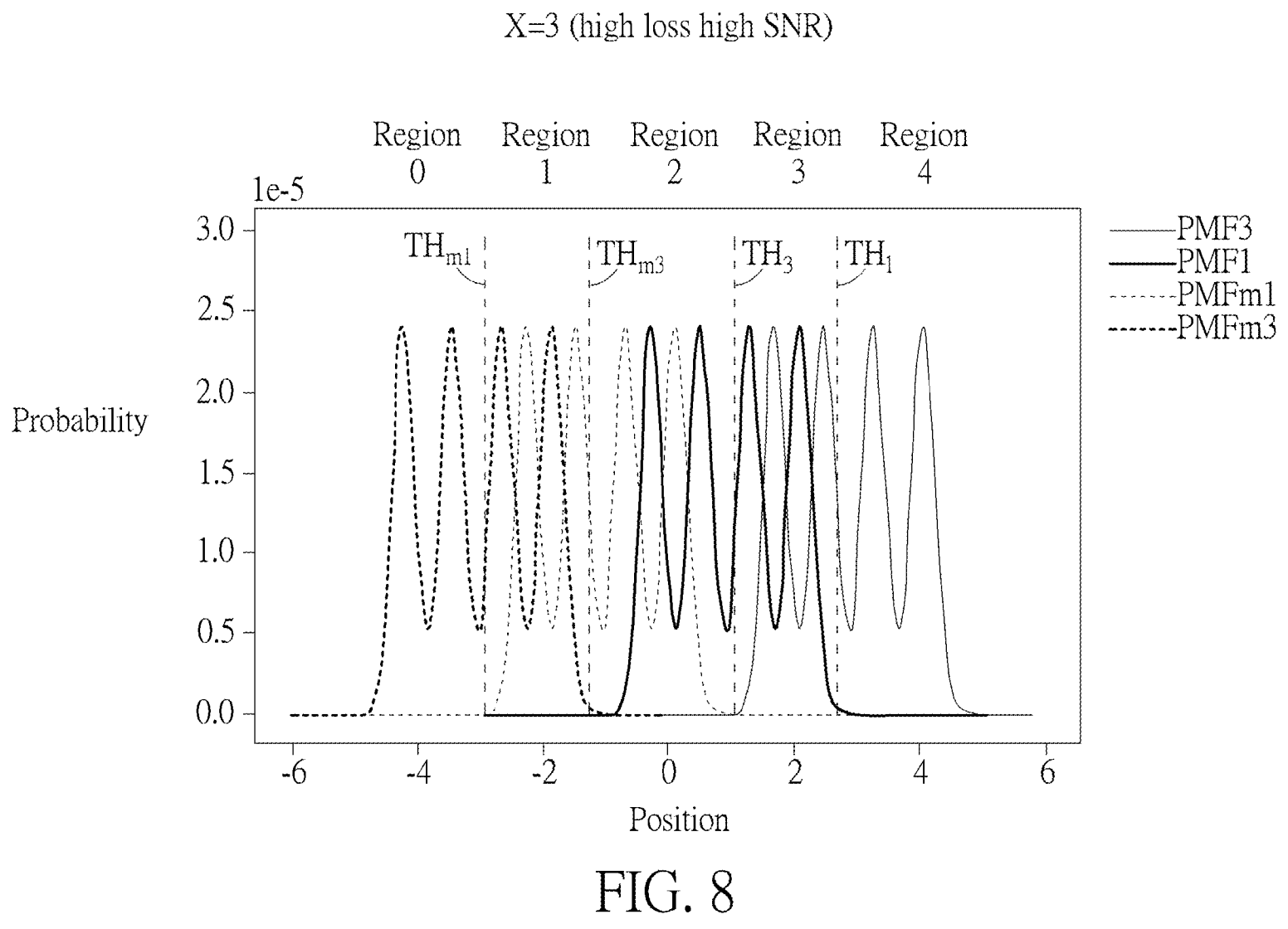

FIG. 8 is a diagram illustrating a first configuration of four programmable threshold values $TH_{m3}$, $TH_{m1}$, $TH_1$, $TH_3$ used by the region estimation circuit 106 that is implemented by a 5-level slicer (X=5) according to an embodiment of the present invention. The region estimation circuit 106 may be used to process samples of the equalized signal S_FFF that is generated from applying a feed-forward filtering operation (e.g., feed-forward equalization) to the received signal S_IN [k] derived from a PAM4 signal. Since probability distributions of different symbols {−3, −1, +1, +3}transmitted over the data channel may vary when the channel condition and/or the signal condition change, the control circuit 116 instructs the region estimation circuit 106 to adaptively adjust the threshold values $THm_3$, $TH_{m1}$, $TH_1$, $TH_3$ for different channel conditions and/or different signal conditions, thereby improving the sequence detection performance. For example, when the channel condition indicator $h_1$ indicates that the current channel condition is a high loss condition and the signal quality indicator SQ (e.g., SQ=SNRIND) indicates that the current signal condition is a high SNR condition, the control circuit 116 instructs the region estimation circuit 106 to adopt the threshold values $TH_{m3}$, $TH_{m1}$, $TH_1$, $TH_3$ illustrated in FIG. 8.

Figure 9:
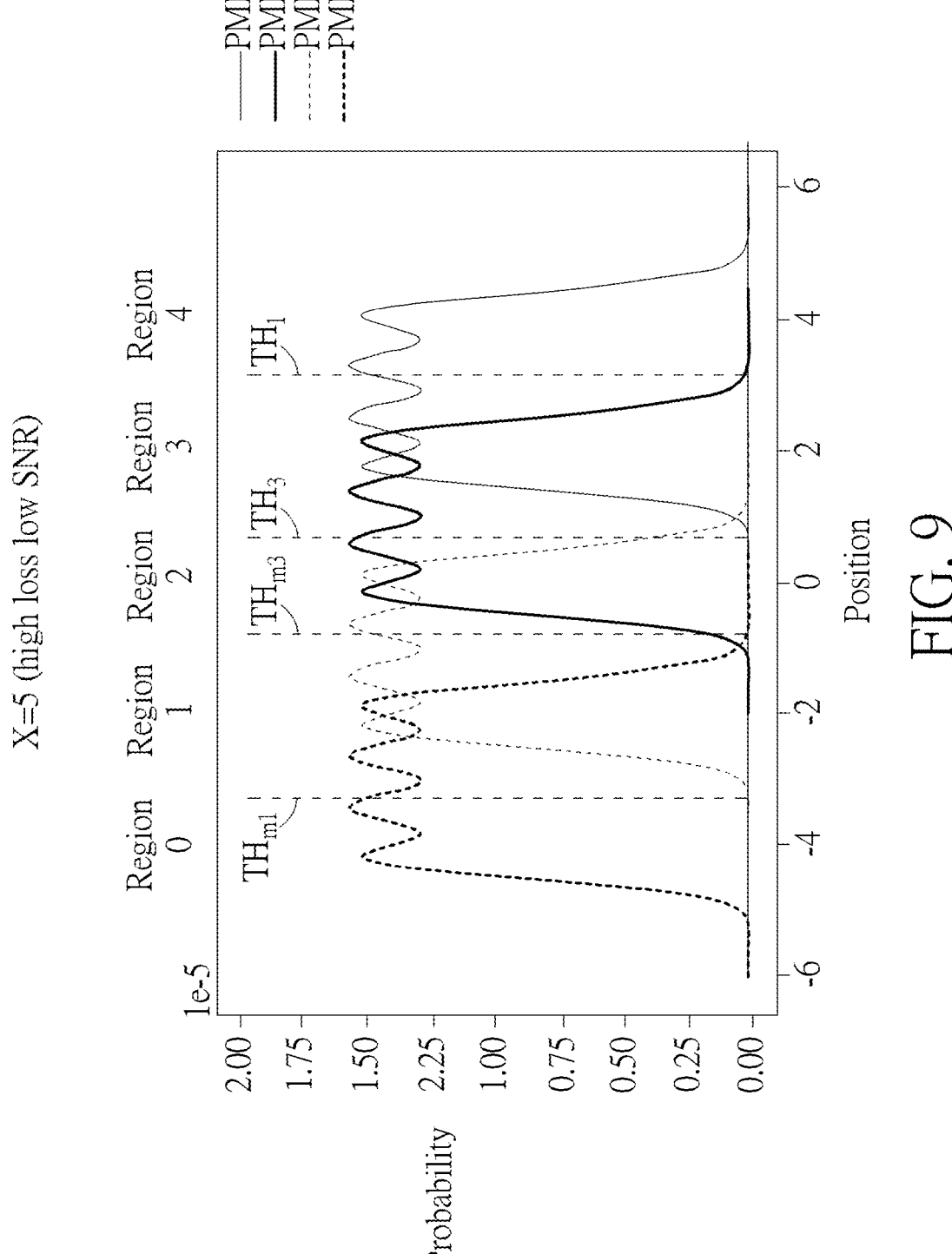
FIG. 9 is a diagram illustrating a second configuration of four programmable threshold values used by the region estimation circuit that is implemented by a 5-level slicer according to an embodiment of the present invention.

FIG. 9 is a diagram illustrating a second configuration of four programmable threshold values $TH_{m3}$, $TH_{m1}$, $TH_1$, $TH_3$ used by the region estimation circuit 106 that is implemented by a 5-level slicer (X=5) according to an embodiment of the present invention. When the channel condition indicator $h_1$ indicates that the current channel condition is a high loss condition and the signal quality indicator SQ (e.g., SQ=SNRIND) indicates that the current signal condition is a low SNR condition, the control circuit 116 instructs the region estimation circuit 106 to adopt the threshold values $TH_{m3}$, $TH_{m1}$, $TH_1$, $TH_3$ illustrated in FIG. 9.

Figure 10:
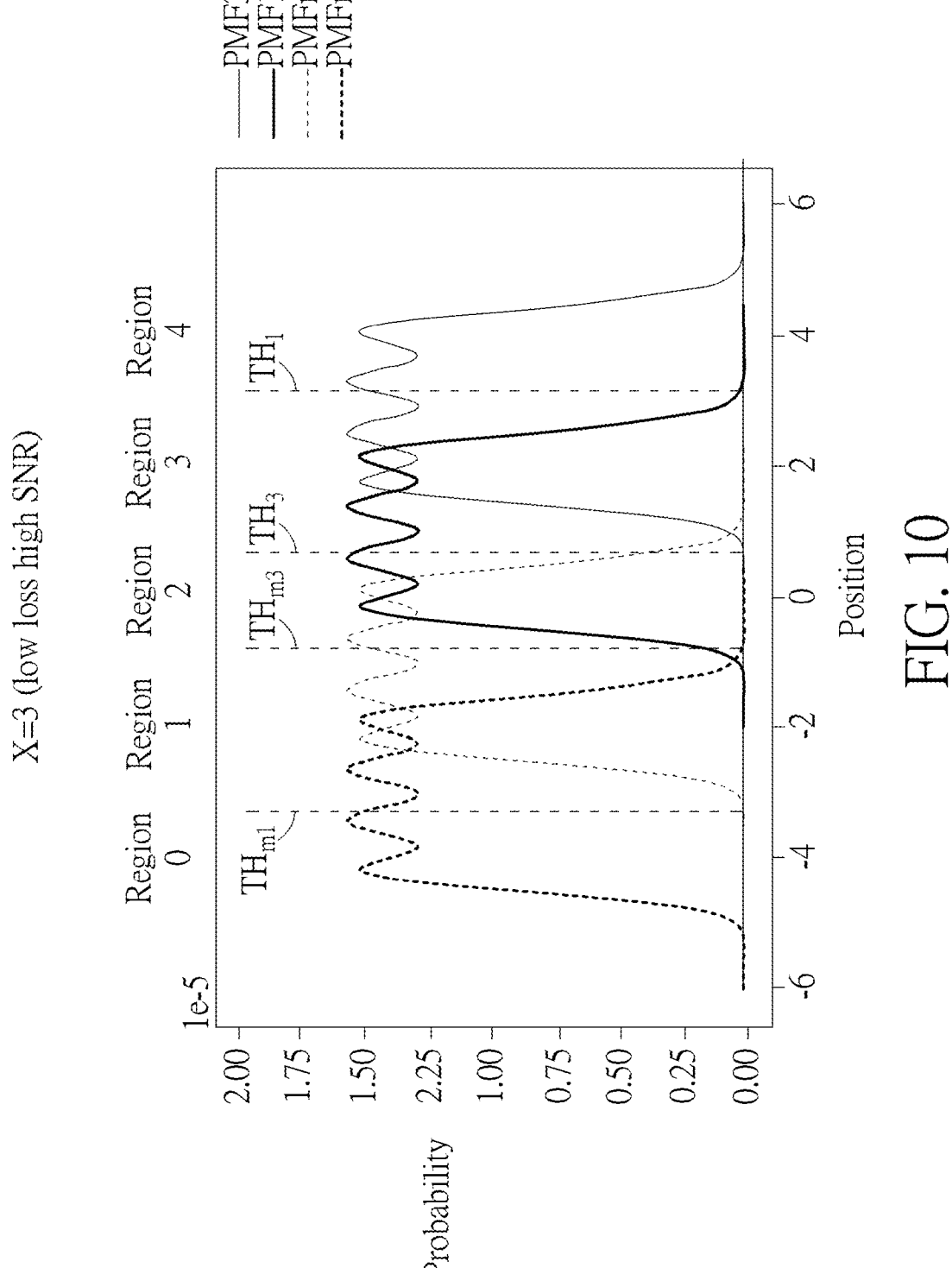
FIG. 10 is a diagram illustrating a third configuration of four programmable threshold values used by the region estimation circuit that is implemented by a 5-level slicer according to an embodiment of the present invention.

FIG. 10 is a diagram illustrating a third configuration of four programmable threshold values $TH_{m3}$, $TH_{m1}$, $TH_1$, $TH_3$ used by the region estimation circuit 106 that is implemented by a 5-level slicer (X=5) according to an embodiment of the present invention. When the channel condition indicator $h_1$ indicates that the current channel condition is a low loss condition and the signal quality indicator SQ (e.g., SQ=SNRIND) indicates that the current signal condition is a high SNR condition, the control circuit 116 instructs the region estimation circuit 106 to adopt the threshold values $TH_L$ and $TH_H$illustrated in FIG. 10.

Figure 11:
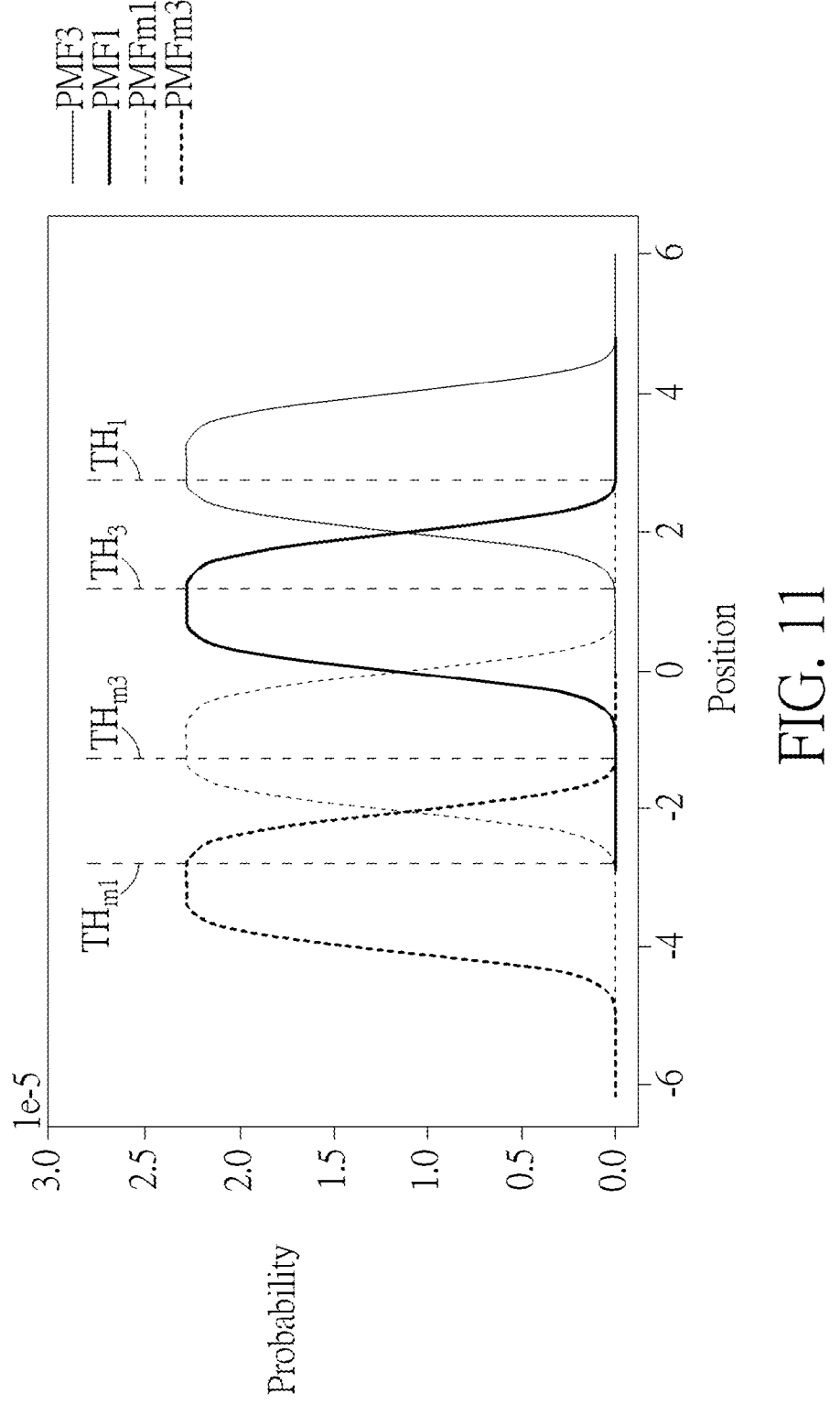
FIG. 11 is a diagram illustrating a fourth configuration of four programmable threshold values used by the region estimation circuit that is implemented by a 5-level slicer according to an embodiment of the present invention.

FIG. 11 is a diagram illustrating a fourth configuration of four programmable threshold values $TH_{m3}$, $TH_{m1}$, $TH_1$, $TH_3$ used by the region estimation circuit 106 that is implemented by a 5-level slicer (X=5) according to an embodiment of the present invention. When the channel condition indicator $h_1$ indicates that the current channel condition is a low loss condition and the signal quality indicator SQ (e.g., SQ=SNRIND) indicates that the current signal condition is a low SNR condition, the control circuit 116 instructs the region estimation circuit 106 to adopt the threshold values $TH_L$ and $TH_H$illustrated in FIG. 11.

Figure 12:
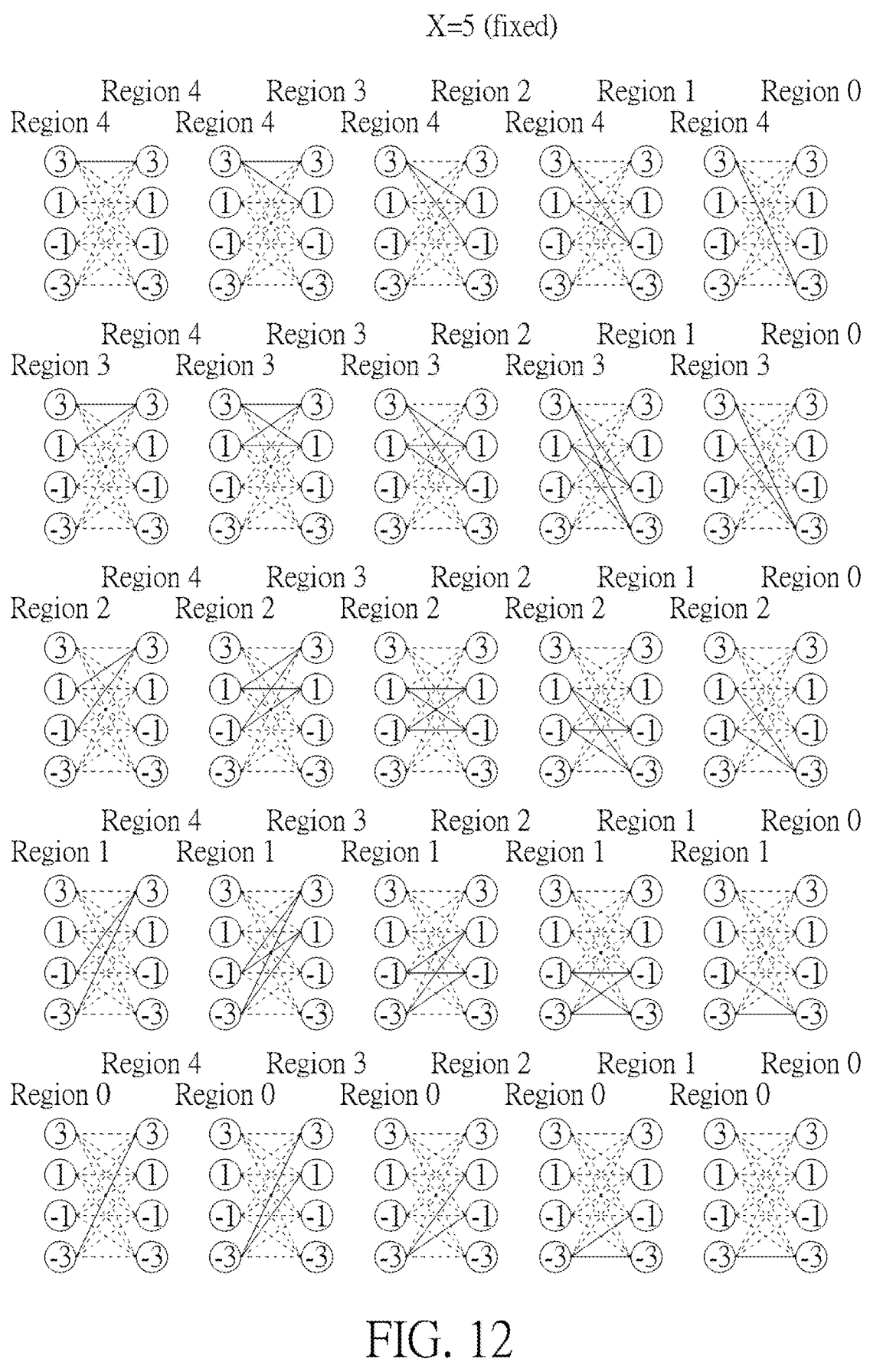

FIG. 12 is a diagram illustrating fixed trellis schemes used by the trellis selection circuit 108 according to an embodiment of the present invention. The fixed trellis schemes shown in FIG. 12 are shared under different channel conditions (e.g., high loss condition and low loss condition) and different signal conditions (e.g., high SNR condition and low SNR condition). Each of the trellis schemes is indexed by a region estimation result of a sample at the time instant T[n−1] and a region estimation result of a sample at the time instant T[n] that are determined using the threshold values $TH_{m3}$, $TH_{m1}$, $TH_1$, $TH_3$ illustrated in any of FIGS. 8-11. Hence, the trellis selection circuit 108 selects one of the fixed trellis schemes for BM computation according to a region estimation result of a sample at the time instant T[n−1] and a region estimation result of a sample at the time instant T[n].

In above embodiments, the region estimation circuit 106 may be used to process samples of the equalized signal S_FFF that is generated for the received signal S_IN[k] derived from a PAM4 signal. However, this is for illustrative purposes only, and is not meant to be a limitation of the present invention. In practice, the received signal S_IN[k] to be processed by the sequence detection device 100 may be derived from any PAM signal. For example, the received signal S_IN[k] may be derived from a Non-Return-to-Zero (NRZ) signal (also called PAM2 signal).

Figure 13:
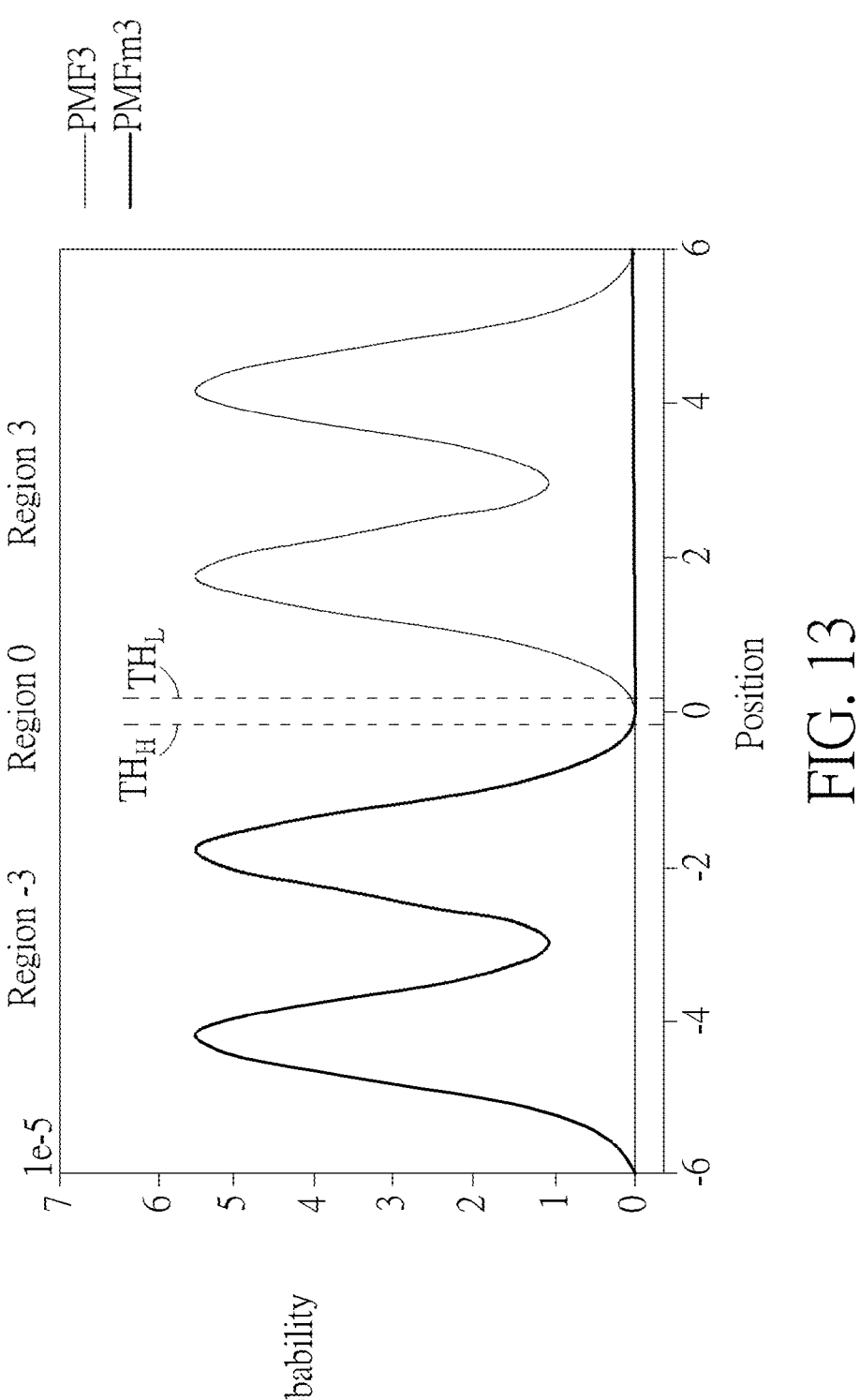
FIG. 13 is a diagram illustrating a first configuration of two programmable threshold values used by the region estimation circuit that is implemented by a 3-level slicer according to an embodiment of the present invention.

FIG. 13 is a diagram illustrating a first configuration of two programmable threshold values $TH_H$, $TH_L$ used by the region estimation circuit 106 that is implemented by a 3-level slicer (X=3) according to an embodiment of the present invention. The region estimation circuit 106 may be used to process samples of the equalized signal S_FFF that is generated from applying a feed-forward filtering operation (e.g., feed-forward equalization) to the received signal S_IN [k] derived from an NRZ signal. The probability density function of the symbol+3 transmitted over the data channel is represented by the probability distribution curve PMF3. The probability density function of the symbol −3 transmitted over the data channel is represented by the probability distribution curve PMFm3. Since probability distributions of different symbols {−3, +3} transmitted over the data channel may vary when the channel condition and/or the signal condition change, the control circuit 116 instructs the region estimation circuit 106 to adaptively adjust the threshold values $TH_L$ and $TH_H$ for different channel conditions and/or different signal conditions, thereby improving the sequence detection performance. For example, when the channel condition indicator $h_1$ indicates that the current channel condition is a high loss condition and the signal quality indicator SQ (e.g., SQ=SNRIND) indicates that the current signal condition is a high SNR condition, the control circuit 116 instructs the region estimation circuit 106 to adopt the threshold values $TH_L$ and $TH_H$ illustrated in FIG. 13.

Figure 14:
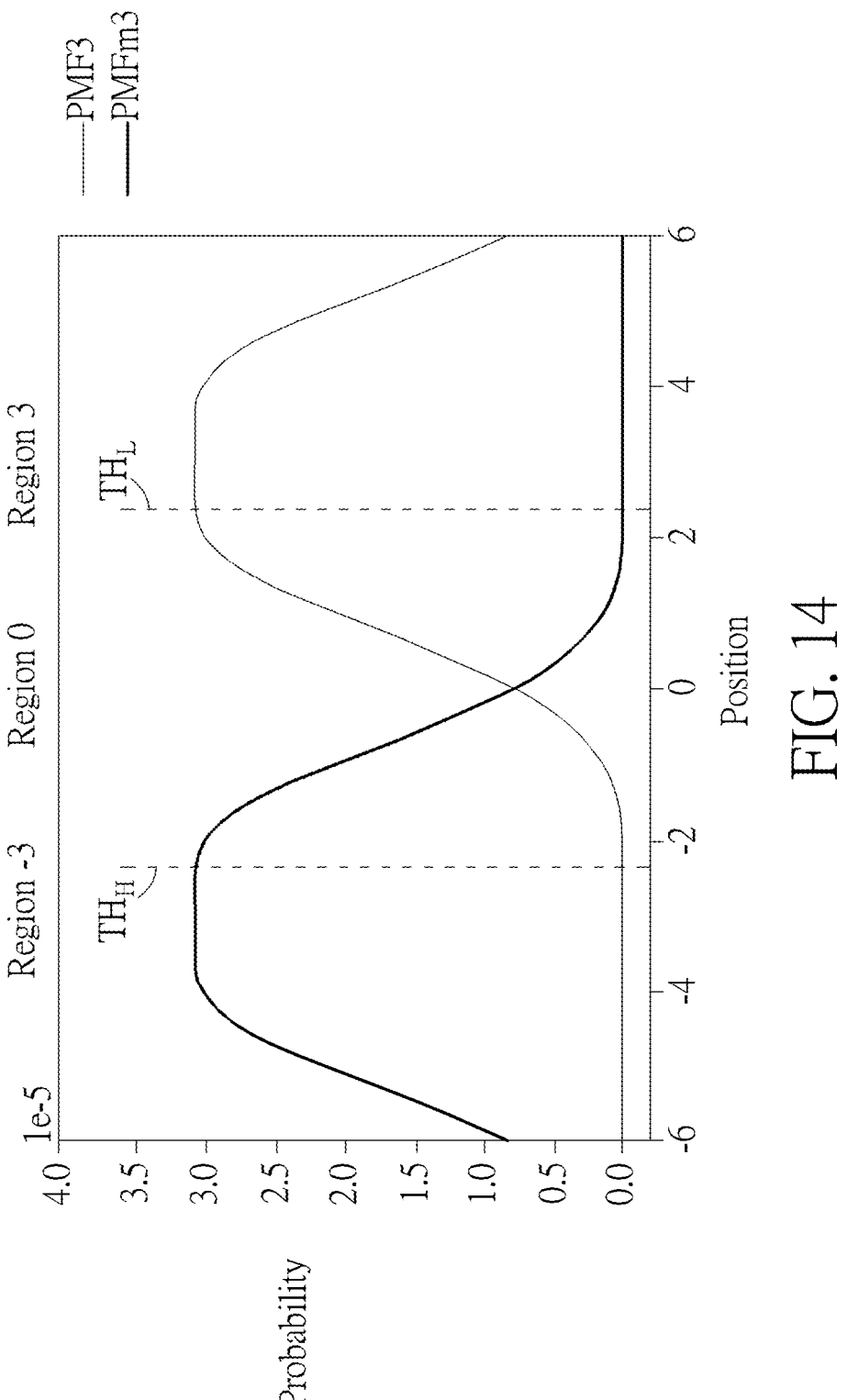
FIG. 14 is a diagram illustrating a second configuration of two programmable threshold values used by the region estimation circuit that is implemented by a 3-level slicer according to an embodiment of the present invention.

FIG. 14 is a diagram illustrating a second configuration of two programmable threshold values $TH_H$, $TH_L$ used by the region estimation circuit 106 that is implemented by a 3-level slicer (X=3) according to an embodiment of the present invention. When the channel condition indicator $h_1$ indicates that the current channel condition is a high loss condition and the signal quality indicator SQ (e.g., SQ=SNRIND) indicates that the current signal condition is a low SNR condition, the control circuit 116 instructs the region estimation circuit 106 to adopt the threshold values $TH_L$ and $TH_H$ illustrated in FIG. 14.

Figure 15:
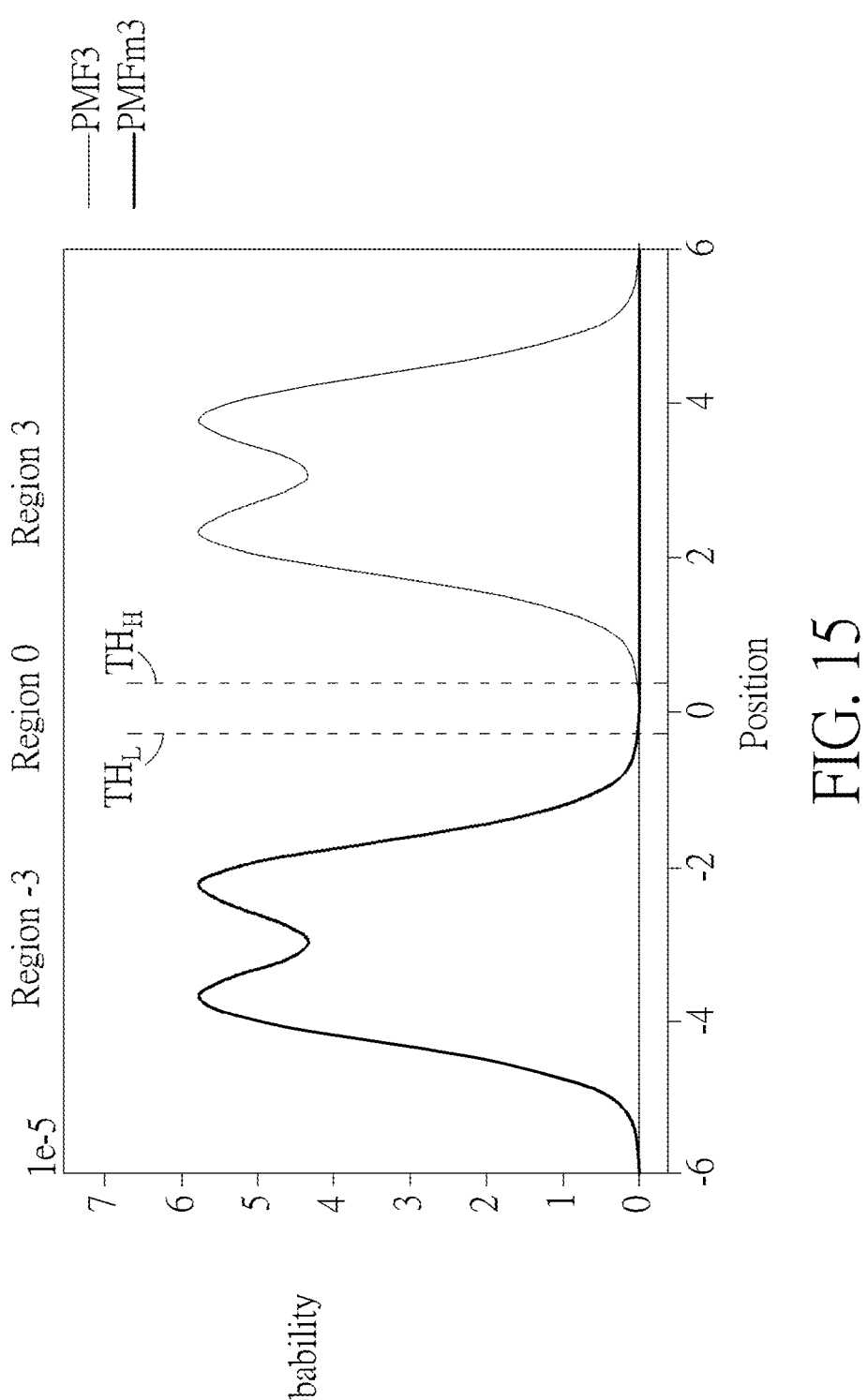
FIG. 15 is a diagram illustrating a third configuration of two programmable threshold values used by the region estimation circuit that is implemented by a 3-level slicer according to an embodiment of the present invention.

FIG. 15 is a diagram illustrating a third configuration of two programmable threshold values $TH_H$, $TH_L$ used by the region estimation circuit 106 that is implemented by a 3-level slicer (X=3) according to an embodiment of the present invention. When the channel condition indicator $h_1$ indicates that the current channel condition is a low loss condition and the signal quality indicator SQ (e.g., SQ=SNRIND) indicates that the current signal condition is a high SNR condition, the control circuit 116 instructs the region estimation circuit 106 to adopt the threshold values $TH_L$ and $TH_H$ illustrated in FIG. 15.

Figure 16:
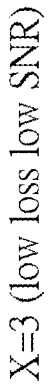
FIG. 16 is a diagram illustrating a fourth configuration of two programmable threshold values used by the region estimation circuit that is implemented by a 3-level slicer according to an embodiment of the present invention.

FIG. 16 is a diagram illustrating a fourth configuration of two programmable threshold values $TH_H$, $TH_L$ used by the region estimation circuit 106 that is implemented by a 3-level slicer (X=3) according to an embodiment of the present invention. When the channel condition indicator $h_1$ indicates that the current channel condition is a low loss condition and the signal quality indicator SQ (e.g., SQ=SNRIND) indicates that the current signal condition is a low SNR condition, the control circuit 116 instructs the region estimation circuit 106 to adopt the threshold values $TH_L$ and $TH_H$ illustrated in FIG. 16.

Figure 17:
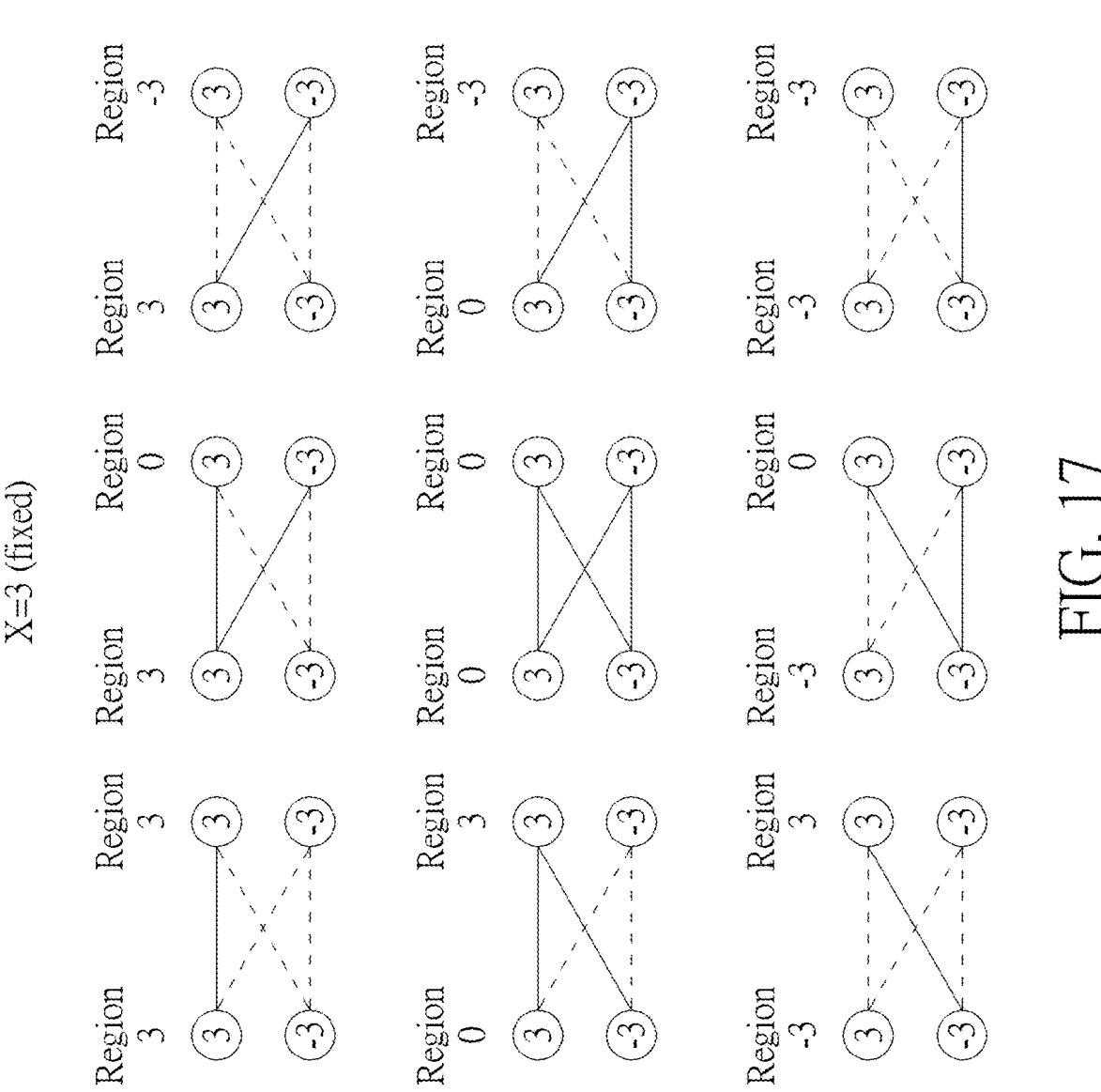
FIG. 17 is a diagram illustrating fixed trellis schemes used by the trellis selection circuit according to an embodiment of the present invention.

FIG. 17 is a diagram illustrating fixed trellis schemes used by the trellis selection circuit 108 according to an embodiment of the present invention. The fixed trellis schemes shown in FIG. 17 are shared under different channel conditions (e.g., high loss condition and low loss condition) and different signal conditions (e.g., high SNR condition and low SNR condition). Hence, each of the trellis schemes is indexed by a region estimation result of a sample at the time instant T[n−1] and a region estimation result of a sample at the time instant T[n] that are determined using the threshold values $TH_L$ and $TH_H$ illustrated in any of FIGS. 13-16. The trellis selection circuit 108 selects one of the fixed trellis schemes for BM computation according to a region estimation result of a sample at the time instant T[n−1] and a region estimation result of a sample at the time instant T[n].

In above embodiments, the data signal to be processed by the sequence detection circuit 104 is the equalized signal S_FFF generated from the FFF (e.g., FFE) 102. Specifically, the data signal fed into the region estimation circuit 106 is the equalized signal S_FFF that is generated from applying a feed-forward filtering operation (e.g., feed-forward equalization) to the received signal S_IN[k]. However, this is for illustrative purposes only, and is not meant to be a limitation of the present invention. In an alternative design, a data signal to be processed by the sequence detection circuit 100 may be the received signal S_IN[k](which is an ADC output), and the FFF (e.g., FFE) 102 may be omitted.

Figure 18:
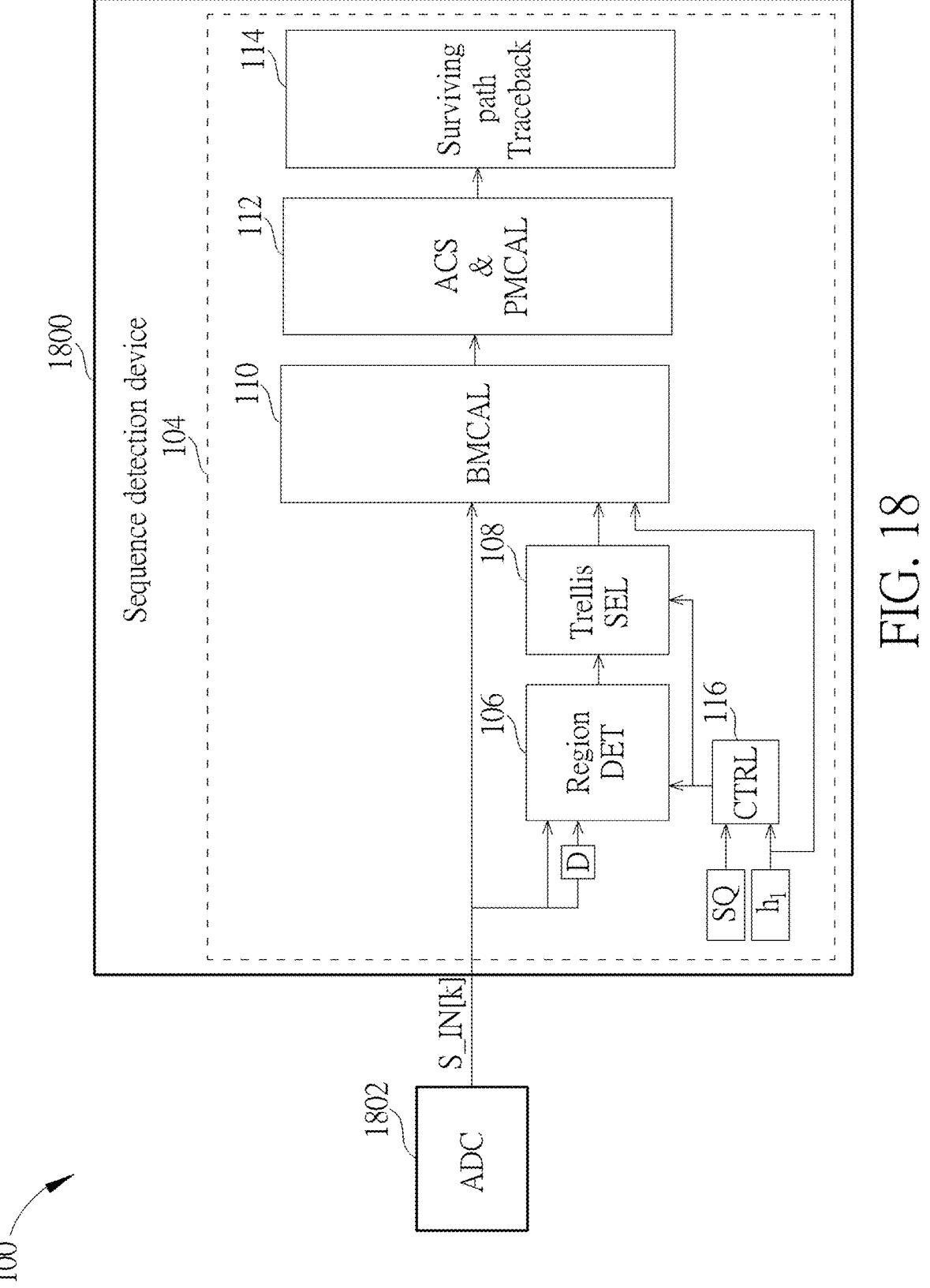
FIG. 18 is a diagram illustrating another sequence detection device using MLSD with programmable BM computation reduction according to an embodiment of the present invention.

FIG. 18 is a diagram illustrating another sequence detection device using MLSD with programmable BM computation reduction according to an embodiment of the present invention. The major difference between the sequence detection devices 100 and 1800 is that the sequence detection device 1800 uses an output of the ADC 1802 (i.e., the received signal S_IN[k] generated from the ADC 1802) as its input signal. The sequence detection device 1800 may be created by applying modifications to the sequence detection device 100, where the modifications may include omitting the FFF 102 and replacing the equalized signal S_FFF at an input node of the sequence detection circuit 104 by the received signal S_IN[k]. Hence, in this embodiment, the region estimation circuit 106 categorizes each of a plurality of samples included in the received signal S_IN[k](which is an ADC output) into one of a plurality of regions. Similarly, the regions (particularly, threshold values that define the regions) adopted by the region estimation circuit 106 for region estimation of each sample (soft data) included in the received signal S_IN[k] may be adaptively adjusted, and/or the trellis schemes adopted by the trellis selection circuit 108 for trellis scheme selection may be adaptively adjusted. As a person skilled in the art can readily understand details of the region estimation circuit 106 and the trellis selection circuit 108 used by the sequence detection device 1800 (which uses the received signal S_IN[k] as a data signal to be processed by the sequence detection circuit 104) after reading above paragraphs directed to the sequence detection device 100, further description is omitted here for brevity.

It should be noted that none of the sequence detection devices 100 and 1800 has a feedback filter implemented therein. For example, the feedback filter may be a decision-feedback equalizer (DFE). Hence, each of the sequence detection devices 100 and 1800 may be a DFE-free sequence detector. In this way, additional power consumption reduction can be achieved due to absence of the feedback filter (e.g., DFE).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sequence detection device comprising:
a feed-forward filter, configured to process a received signal to generate an equalized signal; and
a sequence detection circuit, configured to perform sequence detection upon the equalized signal to generate and output a symbol sequence, wherein the sequence detection circuit comprises:
a region estimation circuit, configured to categorize each of a plurality of samples included in the equalized signal into one of a plurality of regions; and
a trellis selection circuit, configured to select one of a plurality of trellis schemes for branch metric calculation according to region estimation results of two of the plurality of samples output from the region estimation circuit.

2. The sequence detection device of claim 1, wherein the plurality of samples comprise consecutive samples, the consecutive samples comprise a first sample and a second sample following the first sample, the region estimation circuit generates a first region estimation result for the first sample and a second region estimation result for the second sample, and the trellis selection circuit selects a trellis scheme, indexed by the first region estimation result and the second region estimation result, from the plurality of trellis schemes.

3. The sequence detection device of claim 1, wherein the sequence detection circuit further comprises:
a control circuit, configured to adjust the plurality of regions adaptively.

4. The sequence detection device of claim 3, wherein the plurality of trellis schemes are fixed.

5. The sequence detection device of claim 3, wherein the control circuit is further configured to obtain a channel condition indicator and a signal quality indicator, and adaptively adjust a plurality of threshold values according to the channel condition indicator and the signal quality indicator, where the plurality of regions are defined by the plurality of threshold values.

6. The sequence detection device of claim 1, wherein the sequence detection circuit further comprises:
a control circuit, configured to adjust the plurality of trellis schemes adaptively.

7. The sequence detection device of claim 6, wherein the plurality of regions are fixed.

8. The sequence detection device of claim 6, wherein the control circuit is further configured to obtain a channel condition indicator and a signal quality indicator, and adaptively adjust the plurality of trellis schemes according to the channel condition indicator and the signal quality indicator.

9. The sequence detection device of claim 1, wherein the received signal is derived from a pulse amplitude modulation (PAM) signal.

10. A sequence detection device comprising:
a sequence detection circuit, configured to perform sequence detection upon a received signal to generate and output a symbol sequence, wherein the received signal is an output signal of an analog-to-digital converter (ADC), and the sequence detection circuit comprises:
a region estimation circuit, configured to categorize each of a plurality of samples included in the received signal into one of a plurality of regions; and
a trellis selection circuit, configured to select one of a plurality of trellis schemes for branch metric calculation according to region estimation results of two of the plurality of samples output from the region estimation circuit.

11. The sequence detection device of claim 10, wherein the plurality of samples comprise consecutive samples, the consecutive samples comprise a first sample and a second sample following the first sample, the region estimation circuit generates a first region estimation result for the first sample and a second region estimation result for the second sample, and the trellis selection circuit selects a trellis scheme, indexed by the first region estimation result and the second region estimation result, from the plurality of trellis schemes.

12. The sequence detection device of claim 10, wherein the sequence detection circuit further comprises:
a control circuit, configured to adjust the plurality of regions adaptively.

13. The sequence detection device of claim 12, wherein the plurality of trellis schemes are fixed.

14. The sequence detection device of claim 12, wherein the control circuit is further configured to obtain a channel condition indicator and a signal quality indicator, and adaptively adjust a plurality of threshold values according to the channel condition indicator and the signal quality indicator, where the plurality of regions are defined by the plurality of threshold values.

15. The sequence detection device of claim 10, wherein the sequence detection circuit further comprises:
a control circuit, configured to adjust the plurality of trellis schemes adaptively.

16. The sequence detection device of claim 15, wherein the plurality of regions are fixed.

17. The sequence detection device of claim 15, wherein the control circuit is further configured to obtain a channel condition indicator and a signal quality indicator, and adaptively adjust the plurality of trellis schemes according to the channel condition indicator and the signal quality indicator.

18. The sequence detection device of claim 10, wherein the received signal is derived from a pulse amplitude modulation (PAM) signal.

19. A sequence detection method comprising:
obtaining a data signal, comprising:
receiving an output of an analog-to-digital converter (ADC) as the data signal; or
performing a feed-forward filtering operation upon the output of the ADC to generate an equalized signal as the data signal;
performing a sequence detection operation upon the data signal to generate and output a symbol sequence, wherein the sequence detection operation comprises:
performing a region estimation operation to categorize each of a plurality of samples included in the data signal into one of a plurality of regions; and
performing a trellis selection operation to select one of a plurality of trellis schemes for branch metric calculation according to region estimation results of two of the plurality of samples output from the region estimation operation.

20. The sequence detection method of claim 19, wherein the sequence detection operation further comprises:

adjusting the plurality of regions adaptively; or adjusting the plurality of trellis schemes adaptively.

\* \* \* \* \*